United States Patent [19]
Cremisio et al.

[11] 3,766,808
[45] Oct. 23, 1973

[54] BI-METAL SAW BLADE STOCK AND METHOD OF MAKING THE SAME

[75] Inventors: Richard S. Cremisio, Clinton, N.Y.; Charles J. Brabec, Schaumburg, Ill.

[73] Assignee: Contour Saws, Inc., Des Plaines, Ill.

[22] Filed: Apr. 17, 1972

[21] Appl. No.: 244,774

[52] U.S. Cl. .................................... 76/112, 83/835
[51] Int. Cl. ............................................. B23d 63/00
[58] Field of Search ...................... 83/835; 76/112; 29/95 B, 95 R

[56] References Cited
UNITED STATES PATENTS

| | | | |
|---|---|---|---|
| 2,683,923 | 7/1954 | Replogle | 76/112 X |
| 2,686,439 | 8/1954 | Tobert | 76/112 |
| 3,063,310 | 11/1962 | Connoy | 76/112 |
| 3,593,600 | 7/1971 | Adams, Jr. et al | 76/112 |
| 3,674,083 | 7/1972 | Stier et al. | 76/112 X |

*Primary Examiner*—Frank T. Yost
*Attorney*—Ira Milton Jones

[57] ABSTRACT

A bi-metal band saw blade wherein the tips of the teeth are formed of high speed steel which was in the powdered state at the time it was joined to the back-forming steel, and a method of making bi-metal strip stock for the production of such bi-metal band saw blades, wherein the tooth tip-forming steel in the powdered state is bonded to the back-forming steel which is either in the form of a solid bar or also in the powdered state, by hot isostatic pressing which forms the two steels into an integral slab that is rolled into a strip.

17 Claims, 14 Drawing Figures

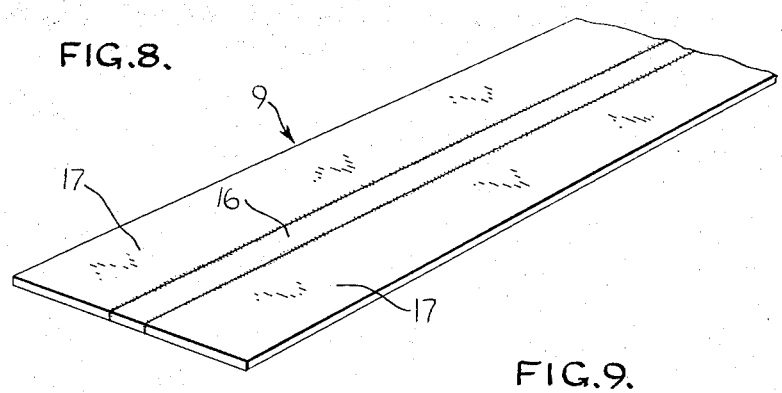
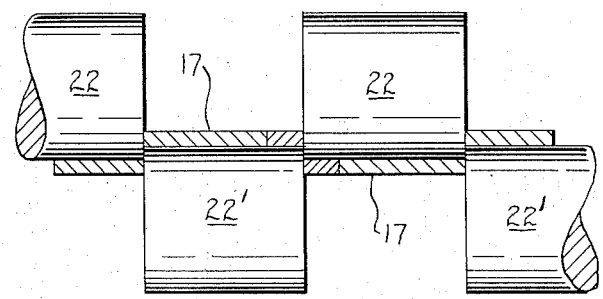
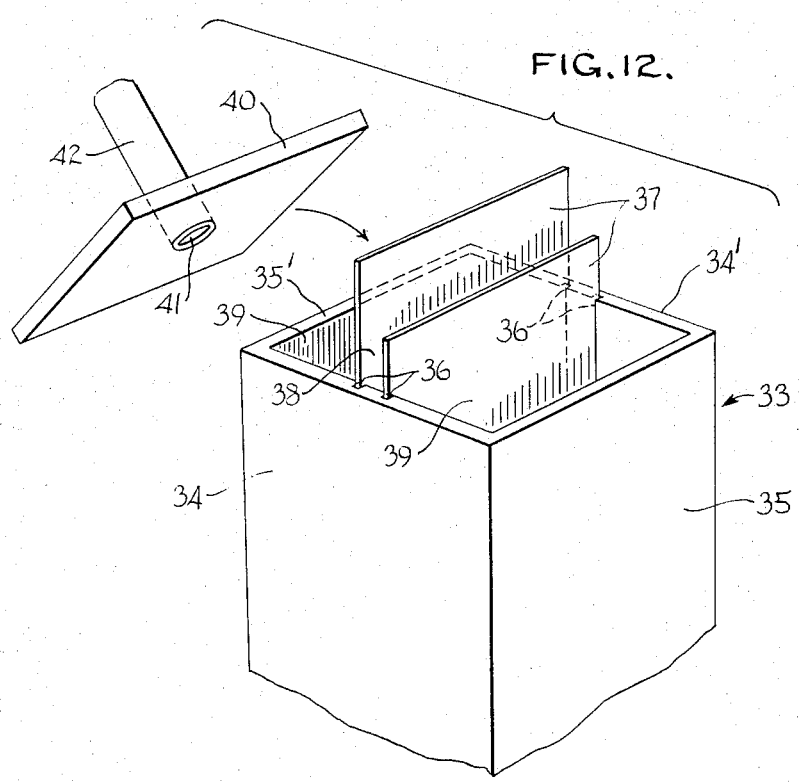

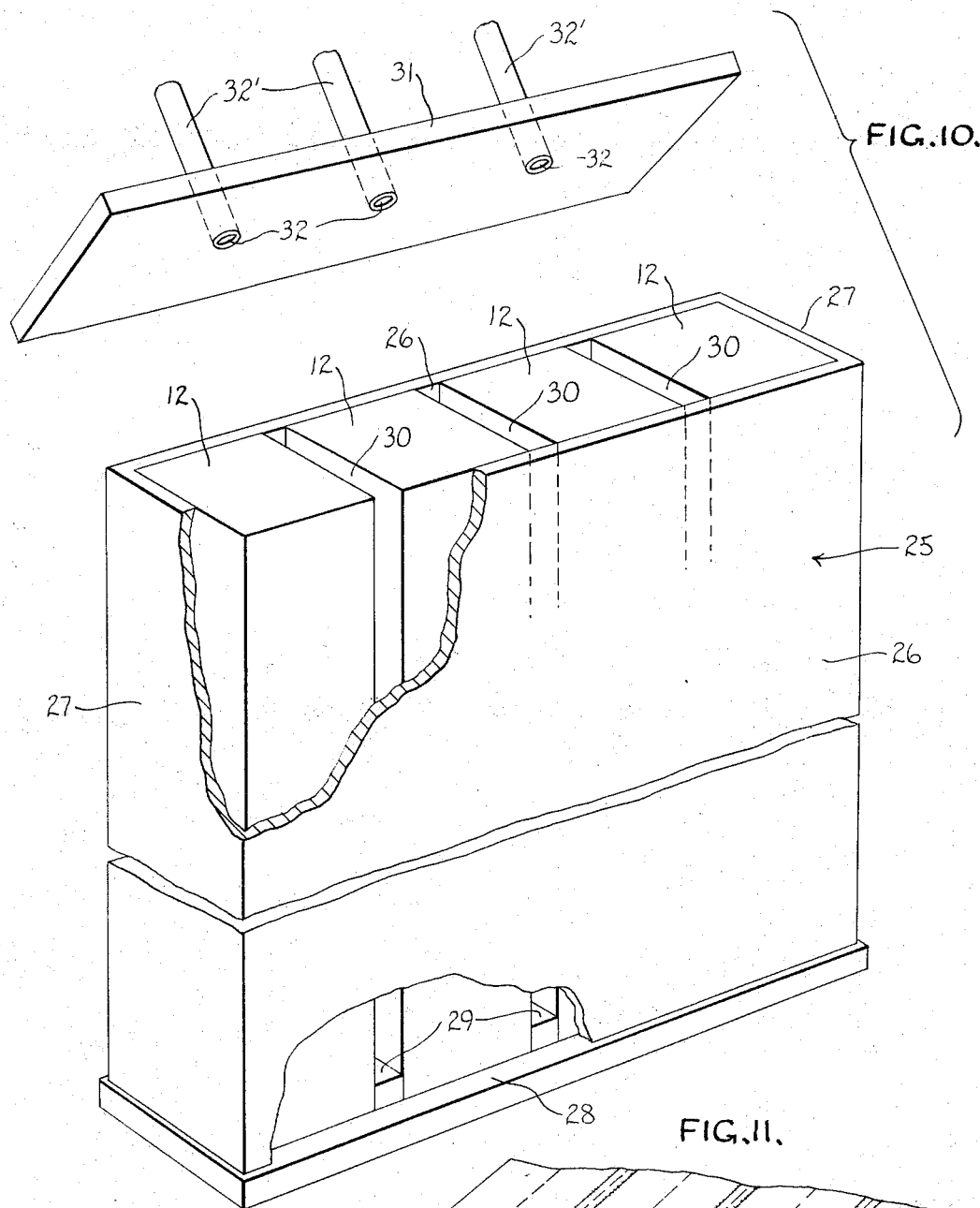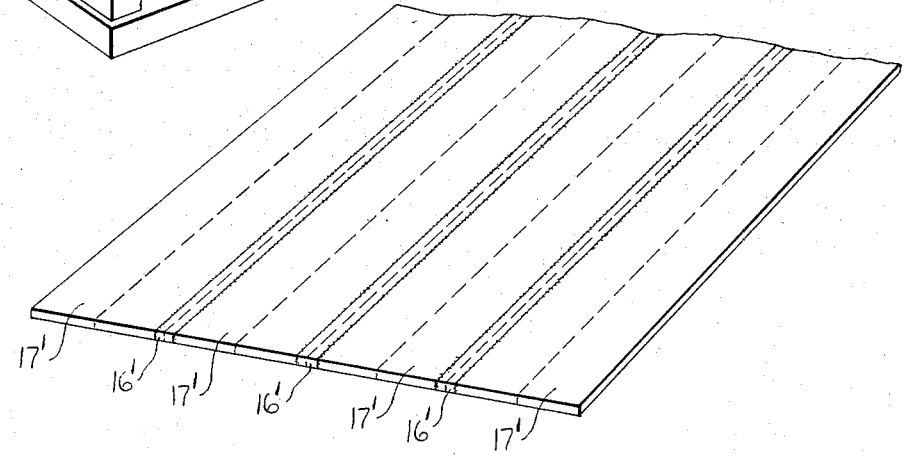

BI-METAL SAW BLADE STOCK AND METHOD OF MAKING THE SAME

This invention relates to band saw blades that are intended for cutting metal and, more particularly, to bi-metal band saw blades wherein the tips of the teeth are formed of high speed steel such as M2 or some other metal having good metal cutting properties, while all the remainder of the blade, i.e. the root portions of the teeth, as well as the body of the saw blade, is formed of another metal that is selected for its good resistance to fatigue. Medium carbon, low alloy steel on the order of D6A has the fatigue resistance needed to withstand the continued flexure to which a band saw blade is subjected in use.

The bi-metal band saw blade produced by the method of the Anderson et al. U.S. Pat. No. 2,786,788, is an example of the type of blade with which this invention is concerned.

The general object of the present invention is to provide a better bi-metal band saw blade than has heretofore been available. To that end, the invention has as its purpose to provide an improved method of making bi-metal strip stock from which bi-metal band saw blades can be readily produced and of achieving without fusion welding a complete, defect-free bond between the two different metals that comprise the stock.

Those skilled in the art are well aware of the fact that the securement or junction of the tooth tip-forming metal to the body-forming metal has presented the most difficult problem in the attainment of a bi-metal band saw blade. Prior to the advent of the invention of the aforesaid Anderson et al. patent, the industry met with nothing but failure in its search for a satisfactory bi-metal band saw blade. Electron beam welding, as employed by Anderson et al., to join the two steels, for the first time made bi-metal band saw blades commercially feasible; but that procedure is costly and often fraught with unpredictable difficulties. Despite the most meticulous attention to all aspects of the operation, the junction of the high speed steel wire to the body material at times was not acceptable. A better way of joining the two metals had to be found, and it is to that objective that this invention is directed.

The answer to the search lay in the discovery that by the hot isostatic pressing (HIP) technique, high speed steel in the pre-alloyed powdered state can be joined to the body-forming steel, either also in the powdered state or in the form of solid bars, to produce an integral slab which can be rolled into a bi-metal strip.

Hot isostatic pressing — as described in the ASME publication 71 WA/PROD-20, presented at the ASME Winter Meeting in Washington D.C., November 28-December 2, 1971, utilizes an inert gas pressure at elevated temperatures for the solid-state diffusion bonding or joining of components of various metals.

By this method, powdered metals and other materials — either in loose form or in the form of a cold compact, can be densified and joined. The materials to be treated are enclosed in an air-tight container of appropriate geometry, which is evacuated and sealed and then placed in a pressure vessel where it and its contents are subjected simultaneously to heat and pressure. Generally, an inert gas is used to pressurize the vessel, and any suitable means may be employed to heat the vessel contents. Much higher densities are achieved by the hot isostatic process than by any other method.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

In the preferred embodiment of the invention, the tooth tip-forming metal is procured in the powdered state. The manner in which the powder is produced forms no part of the invention and may follow any conventional practice. The body-forming metal — though it too could be in the powdered state — is preferably supplied in the form of solid bars of uniform cross section. Compared to prior methods of producing band saw stock which entailed supplying the body-forming metal in strip form, the use of bar stock for this purpose not only lowers raw material costs but also opens more numerous supply channels.

With their surfaces suitably cleaned, two or more vertically oriented bars of the body-forming metals are aligned in a straight row, with adjacent bars uniformly spaced apart. The spaces between adjacent bars are closed at the bottom and sides. This is most conveniently done by securing metal plates to the bars in bridging relation to the spaces therebetween, or by providing a flat-walled oblong-shaped open topped metal cap and placing the bars of body-forming metal in the can, with the bars standing upright on its bottom, in tight surface-to-surface engagement with the side walls of the can. In either case, at least one upright compartment is formed between adjacent bars.

The powdered tooth tip-forming alloy powder, (M2 or the like) which can be pre-blended with a wide assortment of dispersoids or other alloy strengthening additives is now poured into the compartment or compartments between adjacent bars of body-forming metal, and then a cover plate is welded or otherwise tightly secured across the top of the compartment or compartments to form an air-tight enclosure for the powdered tooth tip-forming metal, except for an evacuation port or ports in the cover through which the powder-filled compartment or compartments can be evacuated at the most effective temperature and pressure. This done, the evacuation port is sealed.

There has now been formed a bi-metal assemblage that can be hotpressed isostatically. In accordance with that technique, the bi-metal assemblage is placed in a pressure vessel and therein subjected to an elevated temperature and high pressure. Preferably, the pressure vessel is purged of residual air and then the pressure and temperature therein are simultaneously elevated in such a manner as to minimize harmful convective currents.

By this hot isostatic pressing step, the powdered tooth tip-forming metal is densified and bonded to the bars of body-forming metal. The result is an integral bi-metal slab of exceptional quality. The densified powdered metal has substantially 100 percent density, with an exceptionally fine grain structure and no appreciable segregation.

The temperature and pressure to which the vessel contents are subjected is governed by the type of material being treated. For the purpose of this invention, a temperature of 1,800° to 2250° F, and a pressure of between 15 and 30,000 P.S.I. has been found desirable. However, those skilled in the art will recognize that lower temperatures coupled with higher pressures or higher temperatures coupled with lower pressures could be employed. The length of time the bi-metal assemblage is left in the pressure vessel depends upon the size of the assemblage and whether or not pre and/or post heating cycles are employed.

After being annealed, the bi-metal slab which results from isostatically hot pressing the assemblage is worked into a bi-metal strip having a narrow mid-section of tooth tip-forming metal flanked by wide sections of body forming metal. Preferably this is done by passing the slab between a series of rolls with the junctions of the metals perpendicular to the axes of the rolls.

Whether the assemblage consists of only one mid-section of tooth tip-forming metal between two sections of body-forming metal, or a plurality thereof, the assemblage should be so constructed as to balance the stresses that occur during its subsequent deformation as it is rolled into a strip. In the case of an assemblage having only a single pair of body-forming bars this is most easily achieved by having both bars of equal square cross section and equal length. Where the bi-metal assemblage comprises a number of paired body-forming bars, appropriate adjustment of the relative lengths and/or thicknesses of adjacent body forming bars in a symmetrical manner will assure the needed stress balance.

Although those skilled in the art of rolling steel will readily understand the advisability of annealing the slab at different times during the rolling operation, and when such annealing should be done, it is preferable to anneal just before the final rolling, since the work hardening incident to the rolling operation begins the entire strip to a desirable hardness for the alloys used. The absence of fusion zone mixing characteristic of this invention results in shorter annealing cycles which, in turn, improves economy.

Either before the rolling operation is begun or at some intermediate stage thereof, the container or can is stripped from the slab. This may be done in any suitable way, as by conventional pickling.

When the desired reduction has been attained, the strip is simultaneously slit down the center of its narrow mid-section and outwardly of the mid-section to form two lengths of bi-metal stock of the desired width, one edge of each of which is bounded by the tooth tip-forming metal which initially was in the powdered state.

After this bi-metal strip stock is annealed, sized and straightened to the extent needed, and its back edge finished by blanchard grinding or in any other suitable way, it is ready to be converted into band saw blade. This simply requires milling teeth into the edge of the strip that is bounded by the tooth tip-forming metal, in such a manner that only the tips of the teeth are formed of the initially powdered metal, and then setting the teeth. Hardening and tempering of the thus formed blade — in the manner taught in the aforesaid Anderson et al. patent — completes the bi-metal band saw blade.

Because of the balanced stresses that are assured by the proper construction and geometry of the bi-metal assemblage, the sizing and straightening operations are greatly facilitated.

As noted hereinbefore, the bi-metal assemblage which is subjected to hot isostatic pressing may consist of a single pair of side-by-side solid metal bars of body-forming metal with a proportionate quantity or volume of powdered tooth tip-forming metal therebetween or a number of such pairs of bars. In the latter case, each of those of the solid metal bars inwardly of the endmost bars in the row thereof, provides stock for the bodies of two bi-metal band saw blades. Hence when the multi-sectioned bi-metal strip is slit, not only are its narrow sections of tooth tip-forming metal slit but also its wider sections of body-forming metal.

Straightness of the bi-metal strip before it is slit is a most important consideration. The formation of camber during the rolling of the slab, therefore, can not be tolerated. Symmetry in the bi-metal assemblage, at least as to its internal stresses, is therefore essential; and to assure straightness after the slitting operation, the geometry and cross section of the two solid metal bars flanking each initially powdered metal strata of the assemblage should be identical.

Another very important parameter is parallel and planar relationship between the interfaces between the two metals. This requirement is most easily met by having the body-forming metal in the form of solid bars at the time the assemblage is initially produced. The opposing flat and parallel boundary surfaces of the two bars automatically assures this desired relationship.

The invention, however, also contemplates having the body-forming metal in the powdered state at the time the bi-metal assemblage is formed. In this case, the enclosure containing the two metals, during the hot isostatic pressing step, must be a complete can with a flat bottom and flat end and side walls. The required parallel and planar shape of the interfaces between the two metals is obtained by inserting flat divider strips in the can with the edges thereof in contact with the side walls of the can and, of course, in parallel properly spaced relationship. These strips should be of metal having the same composition as that of either the tooth tip-forming metal or the body-forming metal. As such, during the isostatic hot pressing, the divider strips become an integral part of the bi-metal slab.

The divider strips could be eliminated by having one or both of the powdered metals in prepressed strips and/or bars of proper geometry.

As before, the can in which the powdered metals are placed can be of a size to accommodate a number of alternate bodies of tooth tip-forming metal and body-forming metal, so that the slitting operation would produce more than two lengths of bi-metal band saw blade stock.

As will be more fully described hereinafter, an advantage of having both metals in the powdered state with a divider strip therebetween and/or one or both of the powdered metals in the pre-stressed condition is that it enables the adjustment of the chemistry at the interface. This is accomplished by grading the powder metallurgy components.

Although the invention probably can be understood from the foregoing description, the accompanying drawings are included to facilitate that understanding and to assure completeness of the disclosure. These drawings illustrate examples of the different ways of practicing the invention according to the best modes so far devised for the practical application of the principles thereof, and in which.

Figure 6:
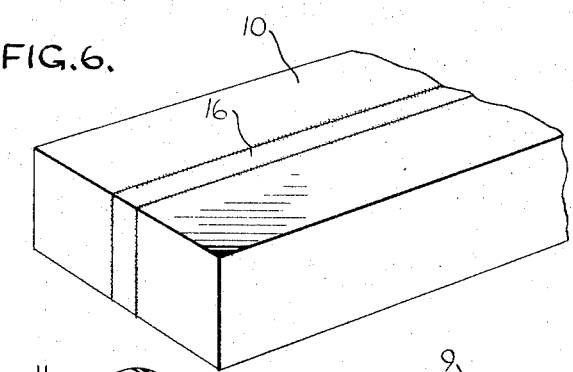
Figure 7:
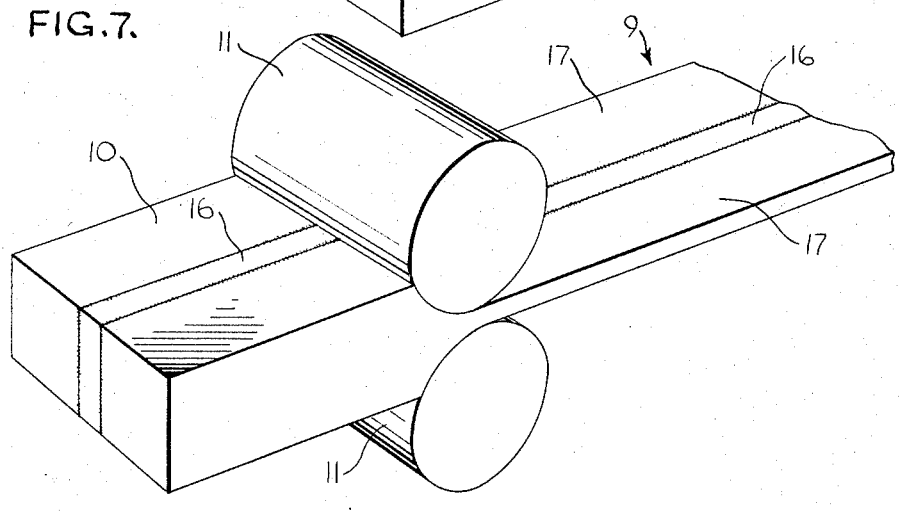
Figure 5:
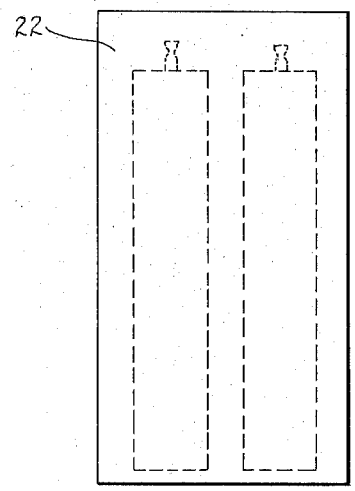

FIG. 5 diagrammatically illustrates two bi-metal assemblages in the pressure vessel;

FIG. 6 is a perspective view of part of a bi-metal slab of which the bi-metal stock was made;

FIG. 7 is a perspective view more or less diagrammatically illustrating one stage in the rolling operation by which the slab is reduced to a bi-metal strip.

Figure 13:
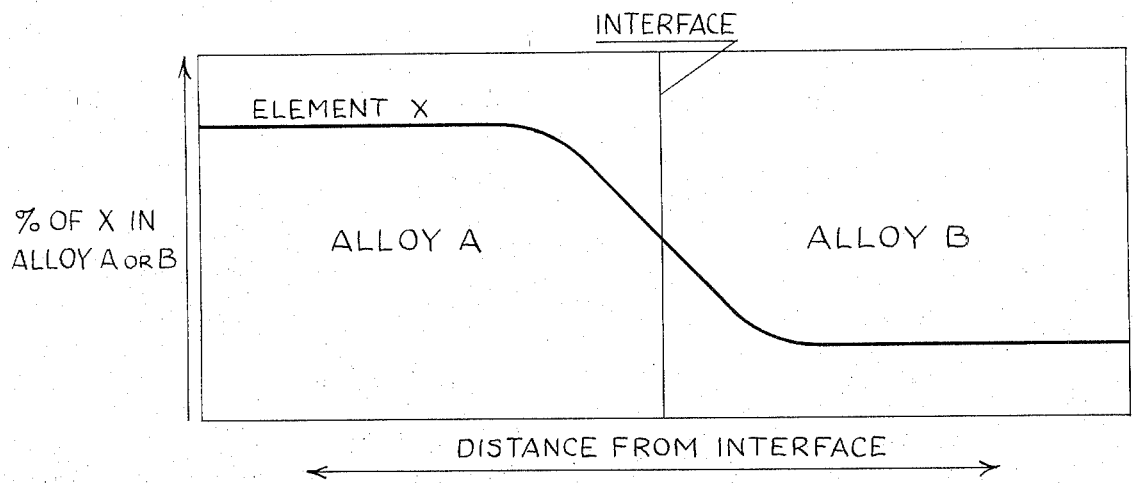
Figure 14:
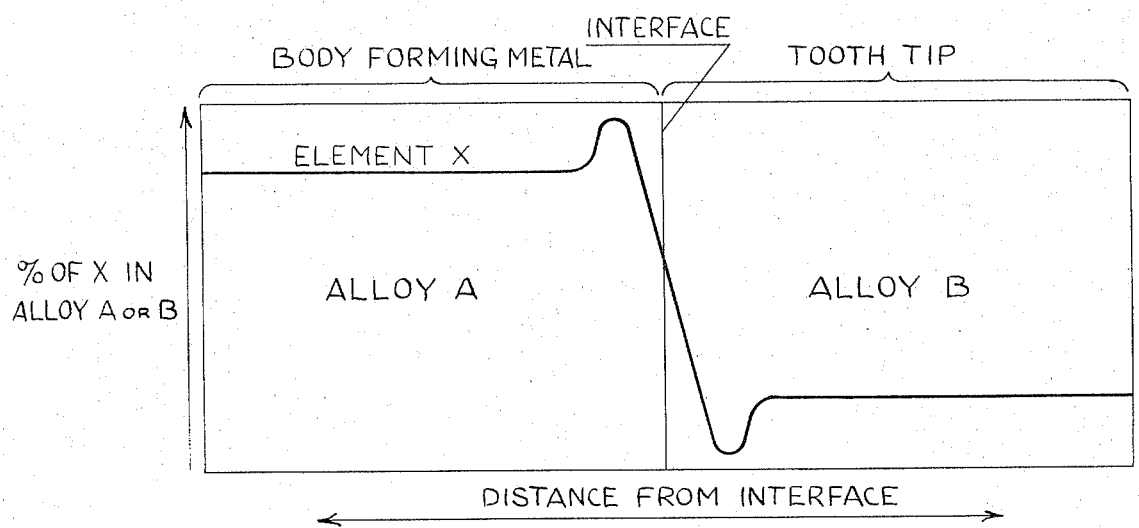

FIG. 8 is a perspective view of a portion of the bi-metal strip that results from the rolling of the slab shown in FIG. 6;

FIG. 9 illustrates the slitting of the bi-metal strip;

FIG. 10 is a perspective view illustrating how a wide bi-metal assemblage having a number of alternate bodies of tooth tip-forming metal and body-forming metal may be formed, with a view to increasing production;

FIG. 11 is a perspective view of a portion of the multiple bi-metal strip that results from rolling the slab that is formed by isostatically hot pressing the assemblage shown in FIG. 10;

FIG. 12 is a perspective view of the upper portion of a can, with the cover removed therefrom, used in the formation of a bi-metal assemblage in which both metals are initially in the powdered state; and FIGS. 13 and 14 are interface chemistry profiles that will be referred to hereinafter.

Referring now to the drawings, the numeral 3 (in FIG. 1) designates the gullets of the illustrated bi-metal band saw blade, 4 identifies the body and 5 its teeth. The area from the back edge 6 of the blade to and including all but the tips 7 of the teeth, is formed of medium carbon, low alloy steel, such as D6A, or any other metal possessing the requisite attributes of a good band saw blade, especially good resistance to fatigue; but the tips 7 of the teeth are formed of high speed steel, or modifications thereof.

Figure 1:
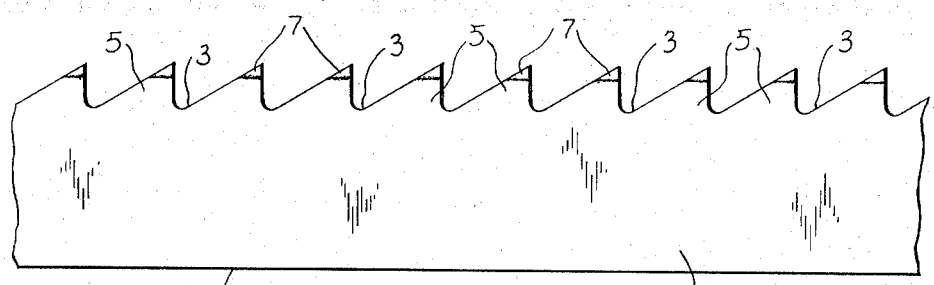
FIG. 1 illustrates a short length a bi-metal band saw blade, the improvement of which is the purpose of this invention.
Figure 2:
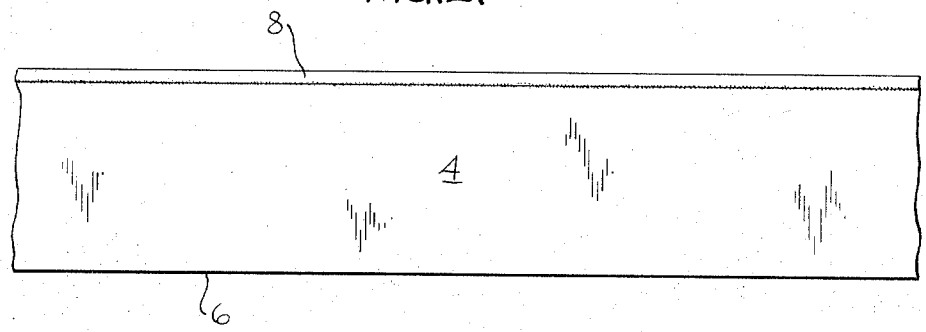
FIG. 2 is a side view of a short length of the bi-metal stock from which the band saw blade of FIG. 1 is formed.

The band saw blade of FIG. 1 was made from the bi-metal stock shown in FIG. 2, one marginal edge portion 8 of which is formed of the high speed steel, while all the rest of the strip is medium carbon, low alloy steel, such as D6A.

The saw teeth are formed in the band saw stock in the customary way by ganged milling cutters operating on a group of clamped together lengths of the stock, the milling cutters being set to cut through the high speed steel edge of the bands to a depth such that only the tips 7 of the teeth are of high speed steel. At the time the milling operation is begun, the bi-metal stock is in an annealed condition.

The band stock, as explained hereinbefore, is produced by slitting the bi-metal strip 9 shown in FIG. 8, down the longitudinal center of the strip and along parallel lines equispaced from the center; and the bi-metal strip is the product of the rolling operation in which the bi-metal slab 10 is passed between a succession of rolls 11 in the conventional manner diagrammatically illustrated in FIG. 7. It is of course essential that the planes of junction between the metals comprising the slab be perpendicular to the axes of the rolls.

Figure 3:
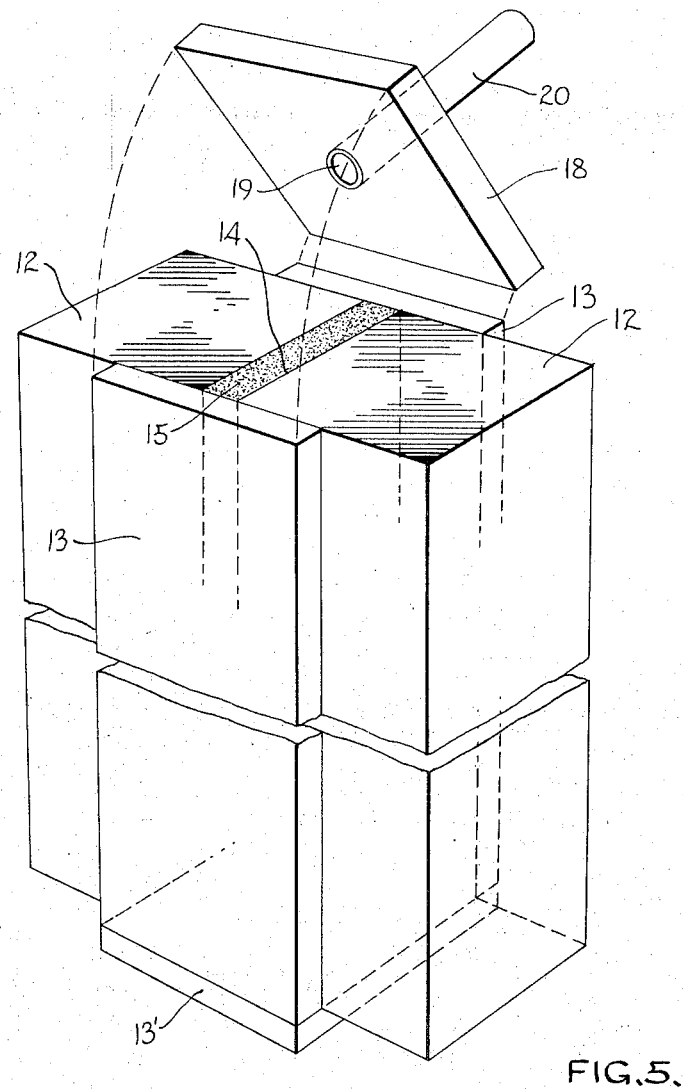
FIG. 3 is a perspective view of the upper end portion of a bi-metal assemblage, and illustrating one way in which the necessary container for the powdered tooth tip-forming metal may be made.

In one embodiment of the invention, the first step in the formation of the bi-metal slab 10 (FIG. 6) is to connect two bars 12 of the metal of which the body of the saw blade is to be formed, in spaced parallel relation, as shown in FIG. 3, by welding steel side plates 13 to the coplanar sides of the bars, and another plate 13' to the bottom of the bars and the lower ends of the side plates. This forms a compartment 14 between the opposing surfaces of the bars, which is filled with the tooth tip-forming metal in the powdered state, as indicated by the numeral 15. To guard against the possibility of camber being produced in the bi-metal strip which results from the subsequent rolling of the slab, the bi-metal assemblage consisting of the two bars 12 and the powdered metal 15 therebetween must have a symmetrical cross section. This is most easily assured by giving the two bars the same cross section, and having their opposing surfaces accurately parallel.

Obviously the width of the space between the bars 14 determines the width ratio of the narrow mid-section 16 (FIG. 3) of the tooth tip-forming metal, and the wide flanking sections 17 of the body-forming metal in the bi-metal strip 9. Accordingly, this space is no wider than necessary to provide the proportionate volume or amount of tooth tip-forming metal in the bi-metal slab needed to assure the mid-section 16 of the bi-metal strip being wide enough to provide two tooth tip-forming edges, one for each of the two lengths of bi-metal stock formed by the slitting operation.

Figure 4:
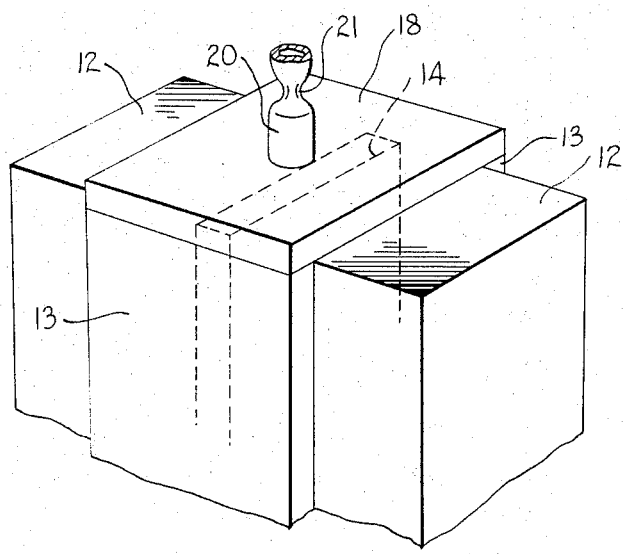
FIG. 4 is a perspective view of the upper portion of the assemblage shown in FIG. 3, but evacuated and sealed, ready to be placed in the pressure vessel in which it is subjected to hot isostatic pressing.

With the powdered tooth tip-forming metal filling the compartment 14, the top of the compartment is closed by welding a cover 18 to the tops of the bars 12 and the adjacent ends of the side plates 13 (FIGS. 3 and 4). This cover has an evacuation port 19 in it with a metal tube 20 projecting therefrom to facilitate connecting the port with a vacuum pump or other source of suction. After the compartment 14 is evacuated, the tube 20 is pinched shut, as shown at 21 in FIG. 4, to seal the compartment.

This completes the formation of the bi-metal assemblage which is then placed in a pressure vessel 22 in which it is isostatically hot pressed. In diagrammatic FIG. 5 two such assemblages are shown in the vessel. In accordance with hot isostatic pressing technique, and as explained hereinbefore, the interior of the pressure vessel — after having been purged — is heated and subjected to high gas pressure, the temerature in the vessel being raised to between 1,800° – 2,250° F, in any suitable manner; and the pressure being brought to between 15,000 and 30,000 PSI. Obviously, the elevation of the temperature should not be at so fast a rate as to cause thermal stresses in the assemblage. Rather, heating should be at such a rate as to insure uniform heat penetration. The bi-metal slab should be retained at the selected temperature and pressure for a period long enough to assure complete densification of the powdered tooth tip-forming metal and its junction to the body-forming metal.

As a specific example — 15 bi-metal assemblages each consisting of four bars of body-forming metal 2 ¼ inches square and 57 inches long spaced apart 5/16 inch with the spaces therebetween filled with powdered tooth tip-forming metal can be simultaneously hot isostatically pressed into integral bi-metal slabs in an eight hour cycle, using a pressure vessel with a 26 inch inside diameter and 60 inches in length. The bi-metal assemblages are pre-heated at 1,200°F before being placed in the pressure vessel, and then, with the vessel sealed, the temperature therein is raised to a maximum of 2,100°F in approximately two hours and pressurized with inert gas to 15,000 PSI; these parameters being maintained for a period of 1 to 2 hours after the vessel contents have attained the stated temperature.

The rolling of the bi-metal slab to form the same into the elongated bi-metal strip 9 (FIG. 7) can be begun without first stripping the side plates 13 therefrom, but this should be done before the rolling operation is completed.

In the slitting operation (diagrammatically illustrated in FIG. 9) by which the bi-metal strip is divided into two lengths of bi-metal band saw blade stock, care should be exercised that the path of the strip with respect to the slitting rolls 22—22', or their equivalent, is such that the center slit accurately bisects the narrow mid-section 16 of the strip and the two trimming slits are parallel with the center slit.

These prerequisites can be met by the use of an electronic tracking device that will follow one of the interface or junction lines and operate in such a manner as to maintain accurately a predetermined ratio of tooth tip material to body material along the full length of the strip.

In the embodiment of the invention wherein the bi-metal slab produced in the manner described consists of a number of pairs of body-forming bars with tooth tip-forming metal between each pair so that the slab can be considered a multi-layered sandwich, the required enclosure of the tooth tip-forming metal is best achieved by welding wide side plates to the coplanar surfaces of the bars and a long bottom plate to the bottom edges of the side plates and the bottom of the endmost bars, to thereby close all of the compartments between the bars at the sides and bottom; and then welding a cover to the top of the side plates and the endmost bars.

Another way of effecting the enclosure is to provide a complete metal can or container like that indicated by the numeral 25 in FIG. 10. This can or container has flat side walls 26 connected by end walls 27 and a bottom wall 28. The side walls are spaced apart a distance to snugly receive the bars 12 therebetween and the end walls 27 are spaced apart sufficiently to accommodate the desired number of pairs of bars plus the needed spaces therebetween. In FIG. 10, there are four bars 12 arranged in a row and held properly spaced by spacers 29 rising from the bottom wall 28, which however should not extend too far up into the compartments 30 between adjacent bars. A cover 31 is welded to the side and end walls 26 and 27 respectively to close the can or container. This cover has an evacuation port 32 for each compartment 30, with a tube 32 projecting therefrom to enable evacuation of all of the compartments — the tubes, of course, being pinched shut to seal the can or container after its evacuation.

The hot isostatic pressing of the multi-sandwiched assemblage of FIG. 10 and the rolling of the resulting bi-metal slab, follows the procedure employed in the production of the strip 9 shown in FIG. 8; but, as shown in FIG. 11, the strip is much wider, and is slit as indicated by the dotted lines, not only down the center of its narrow sections 16', but also down the center of the wider sections 17'. The slitting operation thus simultaneously produces a plurality of lengths of bi-metal blade-forming stock, six in the present instance, but the number of multiples is limited only by the hot pressing and rolling capacity available.

Where the procedure in which the body-forming metal, as well as the tooth tip-forming metal is in the powdered state at the time the bi-metal assemblage is formed, a complete can or container like that shown in FIG. 12, and generally identified by the numeral 33, may be employed. It is formed of metal — typically mild steel — has flat upright walls 34—34', and 35—35' and a bottom wall (not shown). Two opposite walls 34—34' in this case have aligned slits 36 to slidably receive the side edges of a pair of partition strips 37 which, upon being inserted, divide the can or container into a narrow compartment 38 between two wider compartments 39 of the same cross sectional dimensions. Obviously, the powdered tooth tip-forming metal is poured into the narrow middle compartment and the powdered body-forming metal fills the wider flanking compartments.

The partition strip should be of metal having the same composition as one of the two powdered metals, or of a third composition designed to effect smooth transition between the two metals, so that during the subsequent hot isostatic pressing of the assemblage, the partition strips become part of the integral bi-metal slab. As an alternative, presintered powder compacts of one or both metals, suitably shaped, may be used without partition strips.

As in the previously described embodiments of the invention, the can or container 33 (FIG. 12) is closed by a cover 40 after being filled, and then evacuated and sealed, for which purpose the cover has a port 41 with a tube 42 projecting therefrom. Also, while the rolling of the isostatically hot pressed bi-metal assemblage can be begun before the walls of the can or container are stripped therefrom, they should be removed before the final rolling pass.

In all embodiments of the invention, the powdered metal may be either in the loose flowable form or preformed into compacts at the time the bi-metal assemblage is made up.

While mainly M2 high speed steel has been identified as the tooth tip-forming metal, and mainly D6A has been mentioned as the body-forming metal, metals of other compositions can be employed, as for instance:
For the tooth tip-forming metal:
High Speed Tool Steel
Chromium Tool Steel
Semi High-Speed Tool Steel
Shock Resistant Tool Steel
Cobalt Base Tool Steel
(or modifications thereof)
For the body-forming metal:
Medium Alloy Spring Steel
Stainless Steel
Maraging Steel
(or modifications thereof)

Also, the solid bars 12 (FIGS. 3-4) of the body forming metal can be in any one of the following conditions at the time the bi-metal assemblage is made:

1. wrought from cast,
2. wrought from powder,
3. as cast,
4. pre-sintered,
5. compacted.

An exceptionally important and significant advantage of the invention is that it makes feasible and entirely practicable, the incorporation of additives in the metal of which the tooth tips are formed, with a view to improving the strength, ductility and wear-resistance of the tooth tips. For instance, finely divided oxides, nitrides and/or carbides of light, heavy or rare earth elements can be dispersed in the powdered tooth tip-forming metal without adversely affecting its homogeneity or density, while at the same time assuring unprecedented fine grain size of the final product. Specific examples of these additives are:

Thoria
Yttria
Ytterbia
Ceria
Lanthana
Praseodymia
Columbium carbide
Tantalum carbide
Titanium carbide
Hafnium carbide
Uranium carbide
Lanthanum carbide
Cerium carbide
Boron nitride
Zirconium nitride
Aluminum Oxide
Zirconium diboride The dispersion of the chosen additive in the powdered tooth tip-forming metal, is readily accomplished by attrition milling or its equivalent. With this method the additive, as well as the recipient metal, is in the powdered state at the time of the dispersion, and since there is no macroscopic segregation and very minimal micro segregation of the powdered metal during the isostatic hot pressing step, there is minimal impairment of ductility due to segregation in the finished product at ambient temperatures, as distinguished from the situation when additives are incorporated in a host metal of certain alloys made by conventional melting practice.

Another most important advantage of the invention stems from the fact that at least one of the two metals is in the powdered state or pre-sintered powder form at the time the bi-metal assemblage is formed. This enables the chemical activity in the transition zone at the junction between the two metals to be controlled. The importance of this capability will become apparent from the following explanation in which reference is made to FIGS. 13 and 14.

When metals of different chemical analyses are heated while in juxtaposition, the expected co-mingling and interdiffusion of a given element X would be as depicted in FIG. 13. However, during the development of this invention, it was observed that the co-mingling and diffusion of the constituent elements is quite contrary to the expected behavior. FIG. 14 depicts what does occur.

Because of the nature of the specific elements typically involved in this invention, carbon in both the body-forming and tooth tip-forming steels and the strong carbide forming elements such as molybedenum, tungsten, vanadium and chromium inherently associated with high speed steel, the unusual phenomenum depicted in FIG. 14 takes place. As shown, alloy A has more affinity for element X than alloy B, even though element X is present in a larger amount in alloy A. As a consequence, at one side of the interface there is a zone in which the quantity of element X has been depleted and, at the opposite side of the interface a zone enriched in element X.

In the case of bi-metal band saw stock, this phenomenum manifests itself as a decarburized zone in that part of the transition area adjacent to the body-forming steel. The loss of carbon in this decarburized zone could produce weakness just where strength is needed; and, on the other hand, the carbon-enriched zone in that part of the transition area adjacent to the tooth tip-forming steel could have excessive hardness but, unfortunately, coupled with low ductility which, in turn, could result in tooth tip separation in service.

However, since at least one of the two metals is in the powdered state at the time the bi-metal assemblage is formed, the aforesaid objectionable consequence can be avoided by uniformly grading the composition of either of the two steels, or by using a divider strip having a compensatory composition, or by using both of these two corrective measures. The use of powdered metal is the key.

From the foregoing description, taken with the accompanying drawings, it will be apparent that this invention presents an entirely new and economical way of making bi-metal band saw blades, and that the bi-metal blades made in accordance with this invention are superior to any heretofore available.

Those skilled in the art will appreciate that the invention can be embodied in forms other than as herein disclosed for purposes of illustration.

The invention is defined by the following claims:

We claim:

1. The method of making bi-metal stock suitable for the production of bi-metal band saw blades having a body of metal possessing good resistance to fatigue, and teeth with tips of metal having good cutting qualities, which method comprises:

A. providing the metal of which the tooth tips are to be formed in a powdered state;
   B. forming a bi-metal assemblage by placing a proportionate quantity of said powdered metal between the opposing boundary surfaces of two side-by-side bodies of the metal of which the body of the saw blades is to be formed, in such a manner that the interfaces between said bodies and said quantity of powdered metal are parallel and planar;
   C. encasing the powdered metal portion of said bi-metal assemblage and at least the contiguous portions of said two side-by-side bodies of the body-forming metal in an air-tight container;
   D. evacuating and sealing the container;
   E. isostatically hot-pressing the container and its contents to thereby densify and bond the powdered metal to said bodies of body-forming metal and form an integral bi-metal slab;
   F. working said bi-metal slab into an elongated bi-metal strip having a mid-section of tooth tip-forming metal bonded to and flanked by side sections of body-forming metal; and G. slitting said bi-metal strip substantially down the center of its mid-section, to thereby form two lengths of bi-metal band saw blade stock.

2. The method of claim 1, wherein during the slitting of the bi-metal strip the flanking sections of body-forming metal are also slit along lines parallel to and spaced a predetermined distance from the center of the mid-section.

3. The method of claim 1, wherein the working of the slab is done by passing it between rolls with the junctions between the two metals perpendicular to the axes of the rolls.

4. The method of claim 3, further characterized by stripping the container from the slab either before rolling of the slab is begun or at an intermediate stage thereof.

5. The method of claim 1, wherein said bodies of the body-forming metal are in one of the following conditions
  1. wrought from cast,
  2. wrought from powder,
  3. as cast,
  4. pre-sintered, or
  5. cold compacted at the time said quantity of powdered metal is placed between said bodies of back-forming metal.

6. The method of claim 1, wherein said powdered metal is a tool steel having good cutting qualities, and said body-forming metal is an alloy steel having good fatigue resistance.

7. The method of making a band saw blade which comprises:
  A. subjecting the bi-metal stock that has been produced by the method of claim 1, to stress-relieving, straightening and sizing operations, as required;
  B. thereafter, and while said stock is in an annealed condition, milling teeth in that edge portion thereof bounded by the tooth tip-forming metal in such manner that only the tips of the teeth are formed of said tooth tip-forming metal;
  C. setting the teeth; and
  D. hardening and tempering the thus formed saw blade.

8. The method of claim 1, wherein said two side-by-side bodies of body-forming metal are in the form of solid bars at the time said bi-metal assemblage is formed.

9. The method of claim 4, wherein the container is stripped from the bi-metal slab before rolling thereof is begun.

10. The method of claim 1, wherein both of said two metals are in a powdered state at the time they are brought into contiguity to form the bi-metal assemblage, and wherein said container encases the entire assemblage.

11. The method of claim 8, wherein said air tight container is produced in part by securing metal bridging plates to opposite sides of both of the two side-by-side solid bars, so that said bars form part of the container.

12. The method of making bi-metal stock for the production of bi-metal band saw blades having a body of metal possessing good fatigue resistance and teeth with tips of metal having good cutting qualities, which method comprises:
  A. providing each of said two metals in a powdered state;
  B. placing a quantity of tooth tip-forming powdered metal in a container which has air tight walls, between two proportionately larger quantities of the powdered body-forming metal with the interfaces therebetween parallel and planar;
  C. tightly closing the container except for an evacuation port;
  D. evacuating and sealing the container;
  E. isostatically hot pressing the sealed container and its contents to densify the powdered metals and bond them into an integral bi-metal slab;
  F. working said slab into an elongated bi-metal strip having a mid-section of tooth tip-forming metal bonded to and flanked by side sections of body-forming metal; and
  G. slitting the bi-metal strip substantially down the center of its mid-section to thereby form two lengths of bi-metal band saw blade stock.

13. The method of claim 12, wherein during their placement into the container, the two different powdered metals are kept separated from one another by a divider strip of metal having the same composition as one of said two metals.

14. The method of claim 12, wherein during their placement ino the container, the two different powdered metals are kept separated from one another by a divider strip of metal having a composition designed to effect a smooth transition between the two metals.

15. The method of claim 1, further characterized in that a plurality of said bi-metallic assemblages are encased in a common container in multiple sandwich fashion, so that certain of said bodies of body-forming metal are disposed between quantities of said powdered tooth tip-forming metal,
  whereby the isostatic hot pressing of the evacuated and sealed container and its contents, and subsequent working of the resulting bi-metal slab produces an elongated bi-metal strip having a plurality of alternate body-forming and tooth tip-forming metal sections;
  and wherein said sections of body-forming metal, as well as said sections of tooth tip-forming metal are slit substantially down the center of each so as to form more than two lengths of bi-metal band saw blade stock.

16. The method of making bi-metal stock suitable for the production of bi-metal band saw blades having a body of metal possessing good resistance to fatigue, and teeth with tips of metal having good cutting qualities, which method comprises:
  A. providing the body-forming metal in the form of solid bars having the same uniform cross section, each with four flat sides;
  B. providing the tooth tip-forming metal in the powdered state;
  C. forming a bi-metal assemblage by
    1. arranging a number of said bars side-by-side in a row, with their opposing side surfaces parallel, and all spaced apart substantially the same distance, which distance is considerably less than the distance between said spaces, and with the other side surfaces of the bars coplanar,
    2. tightly closing the spaces between adjacent bars except at one end thereof by securing metal plates to the coplanar end and side surfaces of the bars, 3. pouring powdered tooth tip-forming metal through the open ends of the spaces between the bars to substantially fill the same, and
4. tightly closing the open ends of said spaces except for air evacuation ports;
D. evacuating and sealing said powder-filled spaces between the bars;
E. isostatically hot pressing said bi-metal assemblage to thereby densify and bond the powdered tooth tip-forming metal to said bars of body-forming metal and thus form said assemblage into an integral bi-metal slab;
F. working said bi-metal slab into an elongated bi-metal strip having alternate wide and narrow sections formed respectively of the body-forming metal and the tooth tip-forming metal; and
G. slitting the bi-metal strip substantially down the center of each of its narrow sections and also slitting the wide sections between the edges thereof to thereby form a number of lengths of bi-metal band saw blade stock.

17. The method of making bi-metal stock suitable for the production of bi-metal band saw blades having a body of metal possessing good resistance to fatigue, and teeth with tips of metal having good cutting qualities, which method comprises:
A. providing the body-forming metal in the form of solid bars having the same uniform cross section, each with four flat sides;
B. providing the tooth tip-forming metal in the powdered state;
C. forming a bi-metal assemblage by
1. providing a metal can having a bottom wall and upright side and end walls, all securely joined together in an air-tight manner;
2. placing a number of said bars in said can with the bars standing upright on the bottom of the can and spanning the distance between its side walls, and spaced apart to provide a series of compartments all of which have the same rectangular cross section of a width considerably less than the distance between adjacent compartments,
3. pouring powdered tooth tip-forming metal into said compartments, and
4. by means of a metal cover secured to its side and end walls, closing the top of the can;
D. evacuating and sealing the powder-filled compartments;
E. isostatically hot pressing said bi-metal assemblage to thereby densify and bond the powdered tooth tip-forming metal to said bars of body-forming metal and form said assemblage into an integral bi-metal slab;
F. working said bi-metal slab into an elongated bi-metal strip having alternate wide and narrow sections formed respectively of the body-forming metal and the tooth tip-forming metal; and
G. slitting the bi-metal strip substantially down the center of each of its narrow sections and also slitting the wide sections between the edges thereof to thereby form a number of lengths of bi-metal band saw blade stock.

* * * * *